(12) United States Patent
Wada et al.

(10) Patent No.: US 9,199,651 B2
(45) Date of Patent: Dec. 1, 2015

(54) VEHICLE CONTROL APPARATUS AND CONTROL METHOD FOR HYBRID VEHICLE FOR RAILROAD

(75) Inventors: Yasuhiko Wada, Tokyo (JP); Hisanori Yamasaki, Tokyo (JP); Keita Hatanaka, Tokyo (JP); Yuruki Okada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/368,450

(22) PCT Filed: Jan. 31, 2012

(86) PCT No.: PCT/JP2012/052181
§ 371 (c)(1),
(2), (4) Date: Jun. 24, 2014

(87) PCT Pub. No.: WO2013/114575
PCT Pub. Date: Aug. 8, 2013

(65) Prior Publication Data
US 2014/0350757 A1     Nov. 27, 2014

(51) Int. Cl.
*B60L 11/02*     (2006.01)
*B61C 17/12*     (2006.01)
(Continued)

(52) U.S. Cl.
CPC . *B61C 17/12* (2013.01); *B60K 6/46* (2013.01); *B60W 10/08* (2013.01); *B60W 20/00* (2013.01);
(Continued)

(58) Field of Classification Search
USPC ............... 318/140, 141, 146, 151, 430, 476; 322/16, 28; 701/19, 99
See application file for complete search history.

(56) References Cited

U.S. PATENT DOCUMENTS 6,274,943 B1     8/2001  Hasegawa et al.
2008/0315817 A1*  12/2008  Yonemori et al. ....... B60K 6/46
                                                  318/476

FOREIGN PATENT DOCUMENTS

EP     1 052 400  A2    11/2000
EP     1 052 401  B1     9/2003
(Continued)

OTHER PUBLICATIONS

International Search Report (PCT/ISA/210) mailed on Apr. 24, 2012, by the Japanese Patent Office as the International Searching Authority for International Application No. PCT/JP2012/052181.
(Continued)

*Primary Examiner* — Adam Tissot
(74) *Attorney, Agent, or Firm* — Buchanan Ingersoll & Rooney PC

(57) ABSTRACT

In a vehicle control apparatus, a system controller that overall controls an engine controller and a converter controller is provided. The system controller drives, through the converter controller, a generator with a generator-rotational-speed command value ωc_ref1 smaller than idling maintenance minimum rotational speed ωe_idol_min of an engine, starts, through the engine controller, fuel injection to the engine after elapse of a predetermined time, and, when the rotational speed of the engine reaches a predetermined rotational speed threshold ωe_th that is larger than the generator-rotational-speed command value ωe_ref and smaller than the idling maintenance minimum rotational speed ωe_idol_min, outputs, to a converter, a gate cutoff signal GSTOP for turning off energization to the generator.

11 Claims, 8 Drawing Sheets

(51) Int. Cl.
  *B60K 6/46* (2007.10)
  *B60W 10/08* (2006.01)
  *B60W 20/00* (2006.01)
  *B61C 7/04* (2006.01)

(52) U.S. Cl.
  CPC .................. *B60W 20/40* (2013.01); *B61C 7/04* (2013.01); *B60W 2510/0642* (2013.01); *B60W 2710/065* (2013.01); *B60W 2710/0644* (2013.01); *B61L 2210/00* (2013.01); *Y02T 10/6217* (2013.01)

(56) References Cited

FOREIGN PATENT DOCUMENTS

| | | |
|---|---|---|
| JP | 10-331749 A | 12/1998 |
| JP | 2000-186654 A | 7/2000 |
| JP | 2001-059437 A | 3/2001 |
| JP | 2002-315222 A | 10/2002 |
| JP | 3890459 B2 | 3/2007 |
| JP | 2008-296907 A | 12/2008 |
| JP | 2009-029397 A | 2/2009 |
| JP | 2009-184500 A | 8/2009 |
| JP | 2010-111144 A | 5/2010 |

OTHER PUBLICATIONS

Written Opinion (PCT/ISA/237) mailed on Apr. 24, 2012, by the Japanese Patent Office as the International Searching Authority for International Application No. PCT/JP2012/052181.

Japanese Office Action mailed on Oct. 30, 2012, with English language translation, 3 pages.

Notice of Preliminary Rejection dated Apr. 6, 2015 issued in the corresponding Korean Patent Application No. 10-2014-7020600 (9 pages).

\* cited by examiner

VEHICLE CONTROL APPARATUS AND CONTROL METHOD FOR HYBRID VEHICLE FOR RAILROAD

FIELD

The present invention relates to a vehicle control apparatus that controls, for example, a hybrid vehicle for railroad and a control method for the hybrid vehicle for railroad.

BACKGROUND

Documents that have disclosed a technology for improving responsiveness in controlling the start of an engine by using a motor generator, for example, include Patent Literature 1 described below.

Patent Literature 1 discloses a technology in which, when an engine restart (reactivation) command is issued, a controller cranks an engine by using a motor generator, after the rotational speed of the engine has reached a predetermined rotational speed, performs rotational speed feedback control of the engine, resumes fuel injection to the engine and spark ignition, determines combustion stability of the engine on the basis of regenerative torque required of the motor generator, and, when determining that the engine changes to a stable combustion state, switches a feedback gain to a relatively small feedback gain.

CITATION LIST

Patent Literature

Patent Literature 1: Japanese Patent No. 3890459

SUMMARY

Technical Problem

However, according to the related art, generator torque and engine torque interfere with each other. Therefore, there is a problem in that it takes time until the engine reaches idling rotational speed and the start of the engine is sometimes unsuccessful.

The present invention has been devised in view of the above and it is an object of the present invention to provide a vehicle control apparatus and a control method for a hybrid vehicle for railroad that can smoothly and surely execute the start of an engine using a generator.

Solution to Problem

In order to solve the above problems and achieve the object, the present invention is a vehicle control apparatus applied to a vehicle driving system including an engine, an engine controller that controls an operation of the engine, a generator coupled to the engine, a converter that converts alternating-current power output from the generator into desired direct-current power, a converter controller that controls an operation of the converter, a load device that receives supply of direct-current power from the converter and operates, a rotational speed detector that detects a rotational speed of the generator, and a battery electrically connected to the load device and the generator, the vehicle control apparatus being configured to be capable of controlling start of the engine, wherein a system controller that overall controls the engine controller, the converter controller, and the converter is provided, and the system controller drives, through the converter controller, the generator with a rotational-speed command value smaller than an idling maintenance rotational speed of the engine, starts, through the engine controller, fuel injection to the engine after an elapse of a predetermined time, and, when a rotational speed of the engine reaches a predetermined threshold that is larger than the rotational-speed command value and smaller than the idling maintenance rotational speed, outputs, to the converter, a control signal for turning off energization to the generator.

Advantageous Effects of Invention

According to the present invention, an effect is obtained where it is possible to smoothly and surely execute the start of an engine using a generator.

DESCRIPTION OF EMBODIMENTS

A vehicle control apparatus and a control method for a hybrid vehicle for railroad according to embodiments of the present invention are explained below with reference to the accompanying drawings. Note that the present invention is not limited by the embodiments explained below.

First Embodiment

Figure 1:
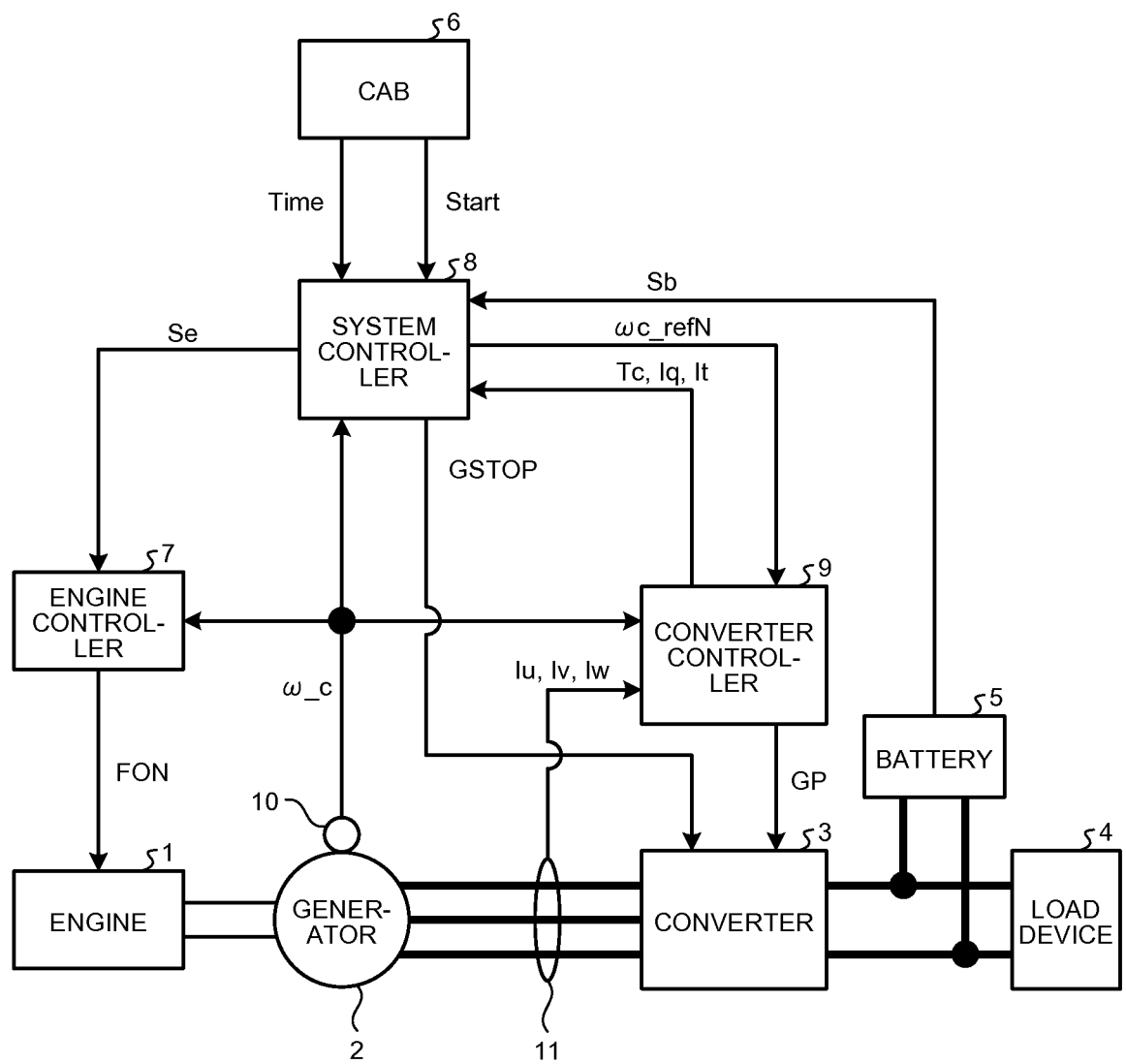
FIG. 1 is a diagram of a configuration example of a vehicle driving system including a vehicle control apparatus according to a first embodiment of the present invention.

FIG. 1 is a diagram of a configuration example of a vehicle driving system including a vehicle control apparatus according to a first embodiment of the present invention and shows the configuration applied to an engine system of a series hybrid type. As shown in FIG. 1, the vehicle driving system according to the first embodiment includes an engine 1, a generator 2 driven by the engine 1 to output alternating-current power, a converter 3 that converts the alternating-current power into desired direct-current power, a load device 4 and a battery 5 electrically connected to the converter 3, a cab 6 with which a motorman performs an operation when performing vehicle control, an engine controller 7 that controls the engine 1, a system controller 8 that controls the engine controller 7 and a converter controller 9, which will be described later, the converter controller 9 that performs power adjustment for the load device 4 and the battery 5, and a rotational speed detector 10 and a current sensor 11 provided as sensors.

Functions of the components shown in FIG. 1 are explained in detail with reference to FIG. 1 to FIG. 5.

The output shaft of the engine 1 and the rotor shaft of the generator 2 are mechanically coupled via a not-shown coupling. Therefore, the rotational speed of the engine 1 (engine rotational speed) and the rotational speed of the generator 2 (generator rotational speed) coincide with each other. The engine 1 generates torque around a shaft (shaft torque) on the basis of a fuel injection command FON issued by the engine controller 7. The generator 2 is, for example, a three-phase alternating-current generator. The generator 2 rotates with a driving force of the engine 1 to generate power. On the other hand, the generator 2 can also operate as a motor. For example, the generator 2 can crank the engine 1 during the start of the engine 1 and rotate the engine 1 using a driving force of the generator 2 to consume electric power.

The converter 3 includes a plurality of switching elements and a plurality of rectifying elements not shown in the figure. When the generator 2 operates as the generator, the converter 3 receives three-phase alternating-current power output from the generator 2, converts, on the basis of a gate signal GP output from the converter controller 9, the input three-phase alternating-current power into desired direct-current power, and supplies the desired direct-current power to any one or both of the load device 4 and the battery 5. On the other hand, when the generator 2 operates as a motor, the converter 3 converts, on the basis of the gate signal GP from the converter controller 9, direct-current power output from the battery 5 into desired three-phase alternating-current power to drive the generator 2. However, when a gate cutoff signal GSTOP is input from the system controller 8, the converter 3 stops the power converting operation irrespective of the presence or absence of the gate signal GP. In this way, the converter 3 can stop driving of the generator 2 according to the gate cutoff signal GSTOP input from the system controller 8.

The load device 4 is electrically connected to the converter 3. The load device 4 receives the supply of the direct-current power from the converter 3 and operates. Note that, although components of the load device 4 are not shown, the load device 4 includes, for example, an inverter device that converts direct-current power into alternating-current power, an electric motor that outputs a driving force for accelerating a railroad vehicle or the like, and a decelerator that decelerates the output of the electric motor and transmits the output to the wheel and axle.

The battery 5 is, for example, a lithium-ion secondary battery. The battery 5 stores the direct-current power supplied from the converter 3 and regenerative power supplied from the load device 4 and, on the other hand, drives the generator 2 and the load device 4 using the stored electric power. Note that the battery 5 can be a battery having any configuration as long as the battery includes functions for storing (charging) and discharging direct-current power.

As described above, the cab 6 is an operation device used by the motorman in performing the vehicle control. During an engine start, the cab 6 generates a vehicle start signal Start and outputs the vehicle start signal Start to the system controller 8, which will be described later. At this point, the cab 6 logs information at fixed intervals from 0 second, which is the timing at which the vehicle start signal Start is sent, generates the logged information as an elapsed time Time, and sends the elapsed time Time to the system controller 8.

Figure 2:
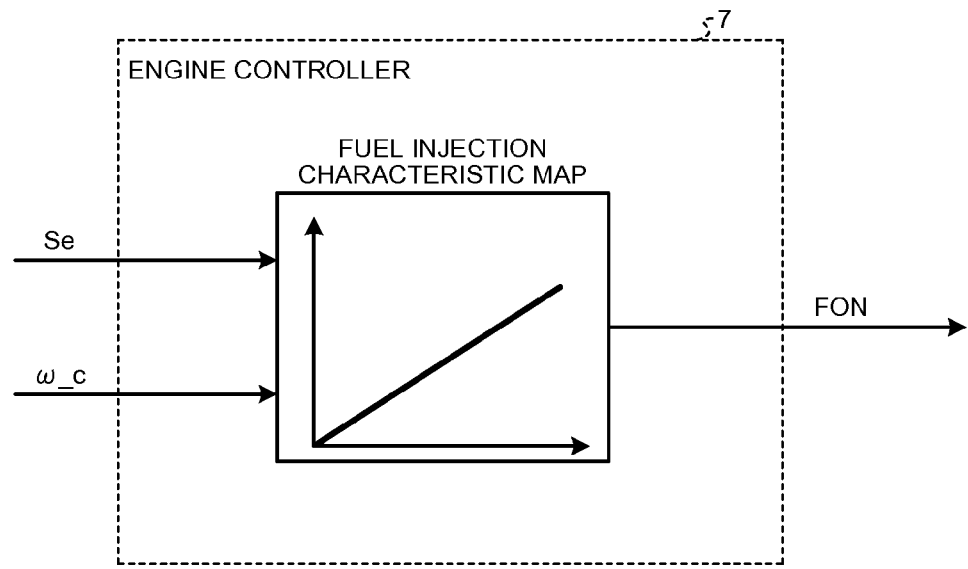
FIG. 2 is a diagram of a configuration example of a fuel injection quantity characteristic MAP provided in an engine controller.

The engine controller 7 is a control unit that controls the engine 1 as described above. As shown in FIG. 2, a fuel injection characteristic MAP corresponding to the rotational speed of the engine 1 is provided in the engine controller 7. The engine controller 7 refers to, on the basis of an engine start signal Se output from the system controller 8, the fuel injection command FON corresponding to generator rotational speed $\omega\_c$ detected by the rotational speed detector 10 from the fuel injection characteristic MAP, thereby driving the engine 1.

The system controller 8 overall controls the engine controller 7, the converter controller 9, and the converter 3 to supply electric power to the load device 4 and the battery 5 and start the engine 1.

The rotational speed detector 10 detects the rotational speed $\omega\_c$ of the generator 2 and outputs the rotational speed $\omega\_c$, which is a detection signal, to the engine controller 7, the system controller 8, and the converter controller 9. The current sensor 11 is connected between the three-phase lines of the generator 2 and the converter 3. The current sensor 11 detects electric currents Iu, Iv, and Iw of the phases and outputs the electric currents Iu, Iv, and Iw to the converter controller 9. Note that, in FIG. 1, all of the electric currents Iu, Iv, and Iw of the phases are detected. However, it is not necessary to detect all of the electric currents Iu, Iv, and Iw and any two electric currents among the electric currents Iu, Iv, and I$\omega\_$can be detected.

Specific control content of the vehicle control apparatus according to the first embodiment is explained.

Figure 3:
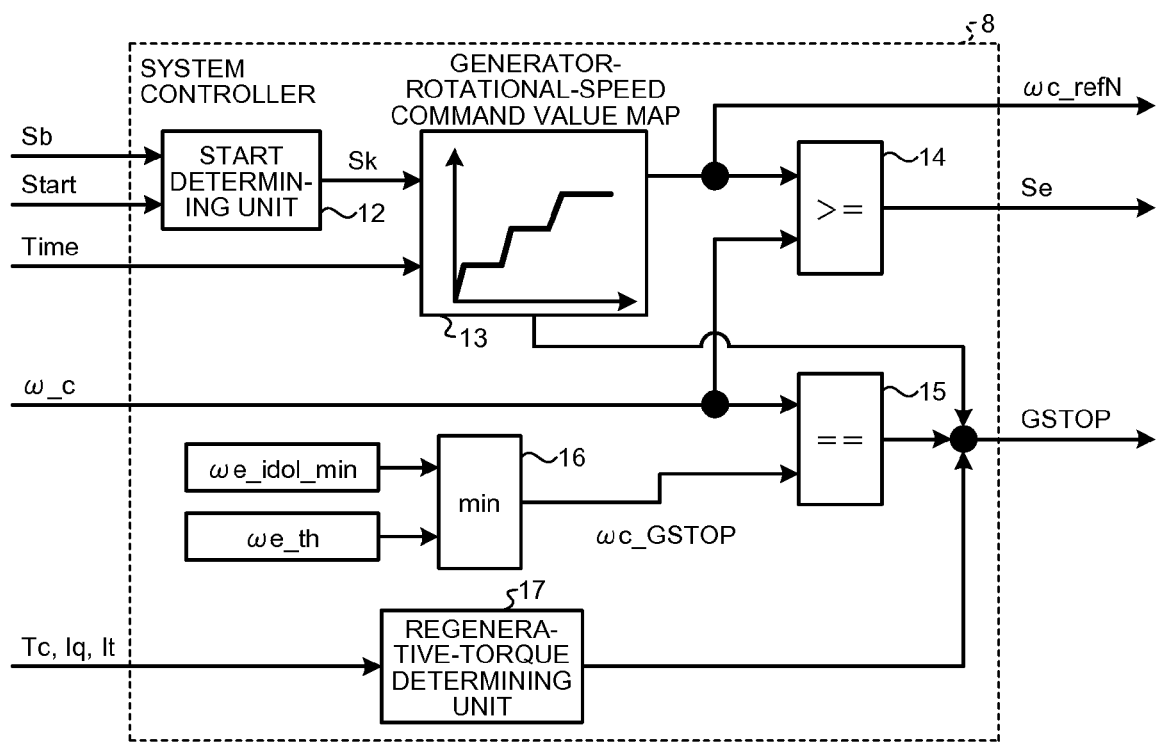
FIG. 3 is a diagram of a configuration example of a system controller.

First, the system controller 8 includes, as shown in FIG. 3, a start determining unit 12, a generator-rotational-speed command value MAP 13, comparators 14 to 16, and a regenerative-torque determining unit 17. A charging state Sb of the battery 5 and the vehicle start signal Start output from the cab 6 are input to the start determining unit 12. The start determining unit 12 determines, on the basis of the charging state Sb and the vehicle start signal Start, whether the start of the engine 1 is possible and outputs an engine start signal Sk. For example, if the charging state Sb of the battery is not an abnormal state and the vehicle start signal Start is in an ON state, the engine start signal Sk indicating "ON" is output to the generator-rotational-speed command value MAP 13.

Figure 4:
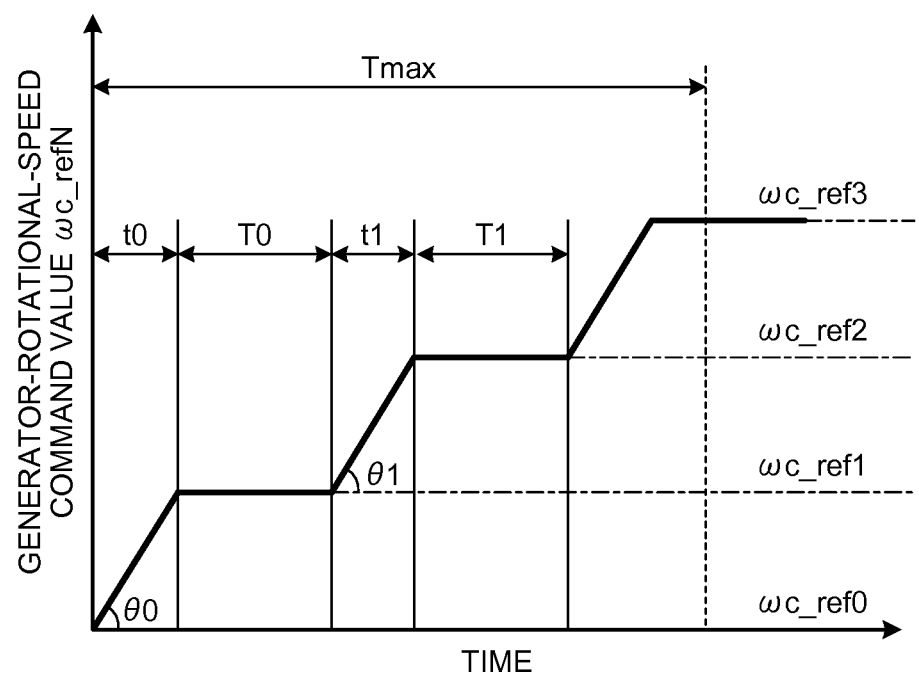
FIG. 4 is a diagram graphically illustrating a generator-rotational-speed command value that changes as time elapses.

In the generator-rotational-speed command value MAP 13, as shown in FIG. 4, predetermined generator-rotational-speed command values $\omega c\_refN$ are stored such that the predetermined generator-rotational-speed command values $\omega c\_refN$ corresponding to the elapsed time Time sent from the cab 6 and the engine start signal Sk sent from the start determining unit 12 are output. The generator-rotational-speed command value $\omega c\_refN$ is set in a range smaller than idling rotational speed $\omega e\_idol$ of the engine 1.

The generator-rotational-speed command value $\omega c\_refN$ is set such that values thereof gradually increase (N is a natural number starting from 0). For example, when the idling rotational speed of the engine is near 650 rpm, values such as $\omega c\_ref0=0$ rpm, $\omega c\_ref1=450$ rpm, and $\omega c\_ref2=500$ rpm are set.

Further, the generator-rotational-speed command value $\omega c\_refN$ is set to reach a generator-rotational-speed command value $\omega c\_ref(N+1)$ through, for example, a fixed time interval tN before reaching the generator-rotational-speed command value $\omega c\_ref(N+1)$. Note that, for the setting of the time interval tN, besides the above, for example, a method of providing a fixed conversion ratio $\theta N$ between the generator-rotational-speed command value $\omega c\_refN$ and the generator-rotational-speed command value $\omega c\_ref(N+1)$ is also conceivable; however, any one of the methods can be used in terms of preventing a sudden increase in the generator rotational speed ω_c. It goes without saying that, when the natural number N is 1 or 2 also, the same setting method can be applied.

Further, the generator-rotational-speed command value ωc_refN is set such that the generator-rotational-speed command value ωc_ref(N+1) is maintained for TN seconds from a point when the generator-rotational-speed command value ωc_refN reaches the generator-rotational-speed command value ωc_ref(N+1). When the natural number N is 1 or 2 also, the generator-rotational-speed command value ωc_refN is gradually increased while maintaining the time interval TN and waits for the timing at which the fuel injection command FON is started from the engine controller 7.

Note that the generator-rotational-speed command value MAP 13 sequentially stores the elapsed time Time sent from the cab 6 in an internal memory. When the accumulated elapsed time Time exceeds a period upper limit value Tmax, the system controller 8 determines that the engine 1 is broken and outputs the gate cutoff signal GSTOP to the converter 3.

Here the description refers back to FIG. 3, the comparator 14 compares the generator-rotational-speed command value ωc_refN sent from the generator-rotational-speed command value MAP 13 and the generator rotational speed ω_c sent from the rotational speed detector 10. When the generator-rotational-speed command value ωc_refN exceeds the generator rotational speed ω_c, the comparator 14 outputs the engine start signal Se to the engine controller 7.

The comparator 15 compares the generator rotational speed ω_c sent from the rotational speed detector 10 and generator-gate-cutoff rotational speed ωc_GSTOP sent from the comparator 16, which will be described later. When the generator rotational speed ω_c coincides with the generator-gate-cutoff rotational speed ωc_GSTOP, the comparator 15 outputs the gate cutoff signal GSTOP to the converter 3.

The comparator 16 compares idling maintenance minimum rotational speed ωe_idol_min and an engine rotational speed threshold ωe_th of the engine 1 and outputs a smaller one of the values to the comparator 15. The idling maintenance minimum rotational speed ωe_idol_min is the rotational speed at which the engine 1 can independently operate when fluctuation in engine characteristics in an operation state and a maintenance state of the engine 1 is taken into account. This rotational speed information is sequentially stored in the system controller 8. The engine rotational speed threshold ωe_th is the rotational speed between the generator-rotational-speed command value ωc_refN and the idling maintenance minimum rotational speed ωe_idol_min of the engine 1. For example, when the idling maintenance minimum rotational speed of the engine 1 is 600 rpm and ωc_refN=450 rpm, the engine rotational speed threshold ωe_th is set to 550 rpm or the like.

The regenerative-torque determining unit 17 determines, from any one of the state quantities, such as a torque current It, a q-axis current Iq, and a torque estimated value Tc from the converter controller 9, whether the generator 2 is performing a regenerative operation. The regenerative-torque determining unit 17 outputs the gate cutoff signal GSTOP. For example, when the sign of the torque estimated value Tc is negative, the regenerative-torque determining unit 17 determines that the generator 2 is performing regeneration and outputs the gate cutoff signal GSTOP.

Figure 5:
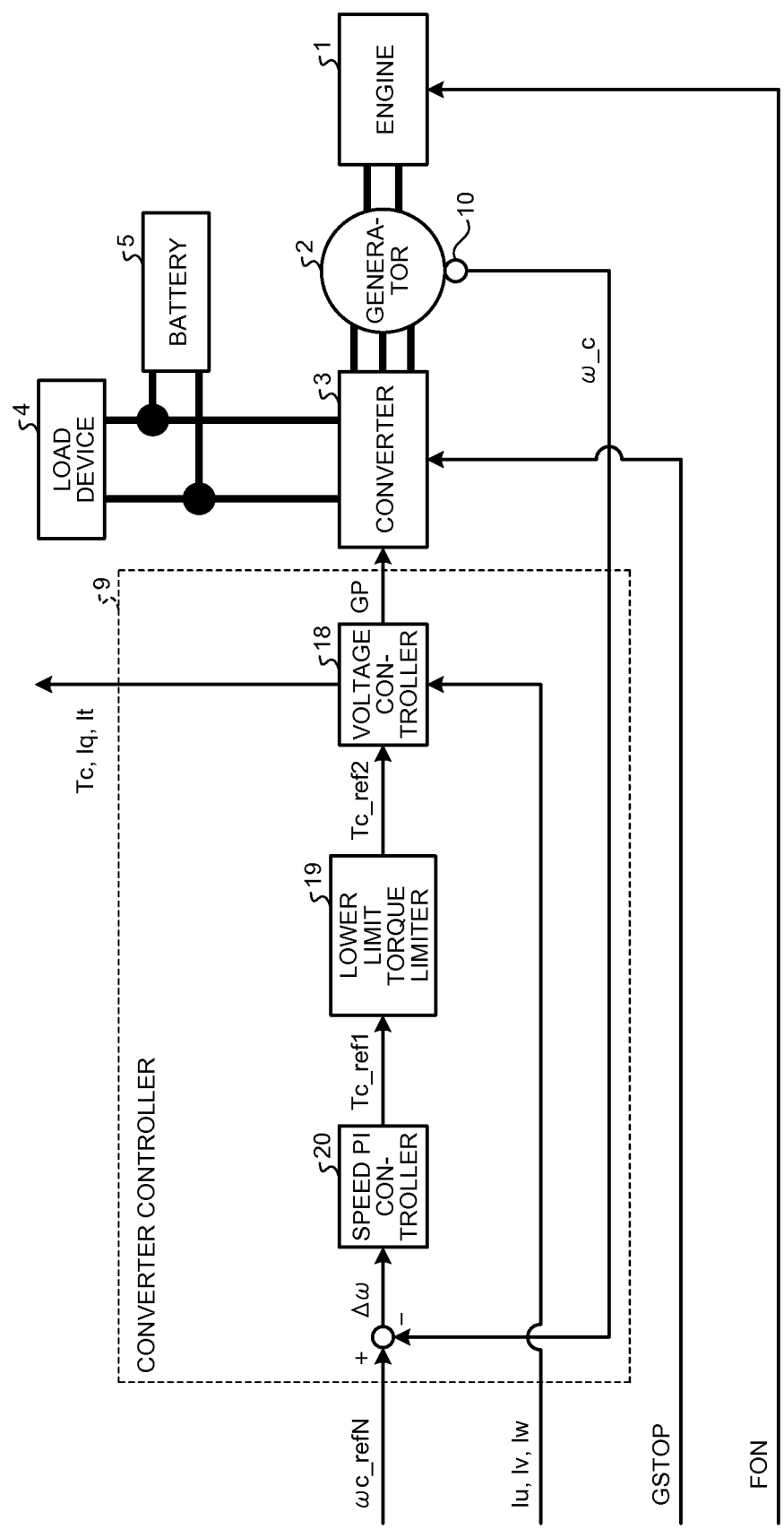
FIG. 5 is a diagram of a configuration example of a converter controller shown on a system diagram of FIG. 1.

The configuration of the converter controller 9 is as shown in FIG. 5. As shown in FIG. 5, the converter controller 9 includes a voltage controller 18, a lower limit torque limiter 19, and a speed PI controller 20.

The converter controller 9 calculates difference information Δw between the generator-rotational-speed command value ωc_refN sent from the system controller 8 and the generator rotational speed ω_c acquired from the rotating shaft of the generator 2. Thereafter, the speed PI controller 20 applies a proportional integration operation based on a gain that is set on the basis of a desired speed control response in advance, on Δw and outputs the result of the operation as a generator torque command value Tc_ref1. The generator torque command value Tc_ref1 is subjected to lower limit processing by the lower limit torque limiter 19 and is output to the voltage controller 18 as a generator torque command value Tc_ref2.

The voltage controller 18 performs so-called vector control for causing output torque of the generator 2 to follow the generator torque command value Tc_ref2, adjusts a voltage command to be output to the converter 3, generates and outputs the gate signal GP through a PWM operation performed in the voltage controller 18 according to the voltage command, and drives the converter 3. Note that the output torque of the generator 2 is controlled by driving the converter 3.

Further, the voltage controller 18 sends, to the system controller 8, information such as the torque current It and the q-axis current Iq (or any one of the torque current It and the q-axis current Iq) or the torque estimated value Tc obtained in the process of the vector control performed using at least two electric currents among the electric currents Iu, Iv, and Iw of the phases detected from the current sensor 11. Note that various publicly-known methods can be used for the vector control in the voltage controller 18. Therefore, detailed explanation of the vector control is omitted. The control by the system controller 8 is as explained above.

With the components explained above, the system controller 8 controls the engine 1 via the engine controller 7 and controls the generator 2 via the converter controller 9 according to the state of the battery 5 and a start signal output from the cab 6. According to these controls, it is possible to perform smooth and sure start of the engine up to the idling rotational speed ωe_idol during the engine start.

The vehicle control apparatus according to the first embodiment includes the functions explained above.

Therefore, first to fourth starting methods and the like explained below can be executed.

(First Starting Method)

Figure 6:
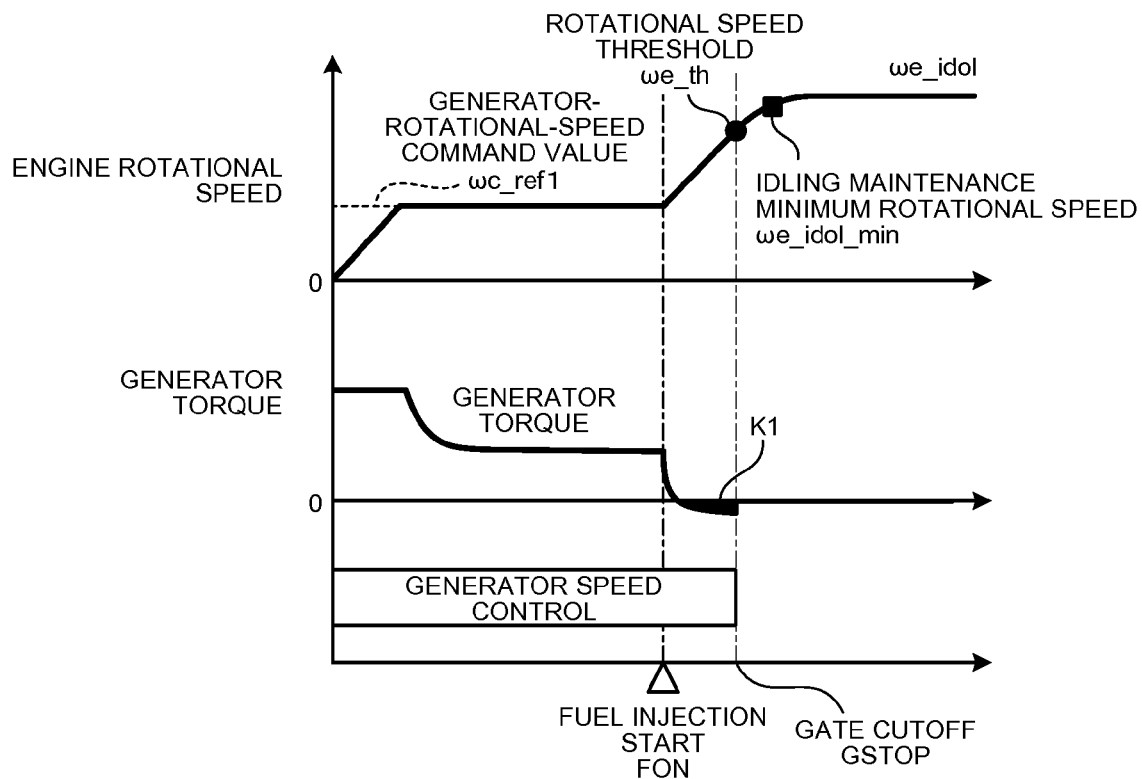
FIG. 6 is a diagram explaining a first starting method in the vehicle control apparatus in the first embodiment.

FIG. 6 is a diagram explaining the first starting method in the vehicle control apparatus in the first embodiment. The horizontal axis indicates the time and the vertical axis indicates the engine rotational speed, generator torque, and a generator rotational speed control section from the top. Note that, in FIG. 1, the generator-rotational-speed command values ωc_ref1 to N are output from the system controller 8 to the converter controller 9; however, before the engine controller 7 controls the engine, specifically, before the fuel injection command FON is output, the engine rotational speed shown in FIG. 6 and the generator-rotational-speed command value ωc_ref1 shown in FIG. 4 are the same value. On the other hand, when the engine 1 establishes the driving force with fuel injection to the engine 1 itself and starts to rotate, the engine 1 is about to accelerate with the driving force of the engine 1 itself to reach the idling rotational speed ωe_idol higher than the generator-rotational-speed command value ωc_ref1. Therefore, in the converter controller 9, the generator torque command value Tc_ref1 is reduced by the action of the speed PI controller 20.

Here the description refers back to FIG. 6. In the first starting method, the rotational speed threshold ωe_th is set between the generator-rotational-speed command value ωc_ref1 and the idling maintenance minimum rotational speed ωe_idol_min. When the vehicle start signal Start, which is a start command for the engine, is output from the cab 6 to the system controller 8, the converter controller 9 controls the generator 2 and controls the rotational speed of the generator 2 and the engine 1 according to a signal output from the system controller 8. The engine rotational speed follows the generator-rotational-speed command value ωc_ref1. As the generator torque, a torque value corresponding to the generator-rotational-speed command value ωc_ref1 is output. When the fuel injection to the engine 1 is started, the engine rotational speed suddenly rises exceeding the generator-rotational-speed command value ωc_ref1. When the engine rotational speed reaches the rotational speed threshold ωe_th, the gate cutoff signal GSTOP is output and the engine 1 continues to independently rotate while maintaining the idling rotational speed ωe_idol. When this control is performed, the generator torque is about to decrease from a certain fixed value to zero as shown in the figure according to the action of the speed PI controller 20 due to difference information between the generator-rotational-speed command value ωc_ref1 and the generator rotational speed ω_c and further decrease to a negative value with which regenerative torque is generated. However, the gate cutoff signal GSTOP is output and the driving of the generator 2 is stopped before the engine rotational speed exceeds the rotational speed threshold ωe_th. Therefore, it is possible to reduce the area of a portion where the regenerative torque is generated (a portion of K1 shown in the figure) to be extremely small. Consequently, during the engine start, the generator torque and the engine torque hardly interfere with each other. Therefore, it is possible to smoothly start the engine 1 up to the idling rotational speed ωe_idol. Further, because the interference between the generator torque and the engine torque can be reduced, it is possible to smoothly and surely execute the start of the engine.

(Second Starting Method)

Figure 7:
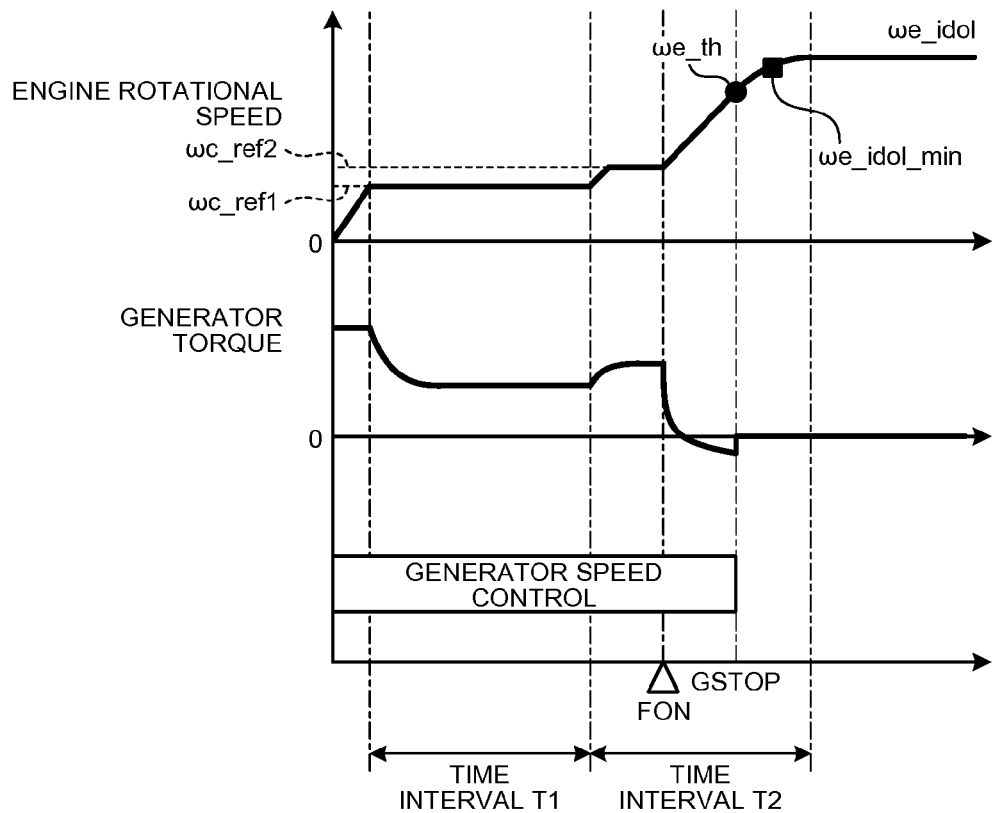
FIG. 7 is a diagram explaining a second starting method in the vehicle control apparatus in the first embodiment.

FIG. 7 is a diagram explaining the second starting method in the vehicle control apparatus in the first embodiment. In the second starting method shown in FIG. 7, generator-rotational-speed command values are provided in multiple stages and gradually increased at time intervals T. Specifically, in an example shown in FIG. 7, after the generator-rotational-speed command value is set to ωc_ref1, the generator-rotational-speed command value is increased to ωc_ref2 after a time interval T1. When the generator-rotational-speed command value is ωc_ref2, the fuel injection command FON is output. According to this control, for example, during a cold period, even when a lubrication state of the engine 1 is poor and the engine 1 cannot be started with the generator-rotational-speed command value ωc_ref1, it is possible to increase the generator-rotational-speed command value to ωc_ref2 and start the engine 1. That is, there is an effect that, even when a start characteristic on the engine 1 side changes depending on the environmental temperature, certainty of the start is improved.

(Third Starting Method)

Figure 8:
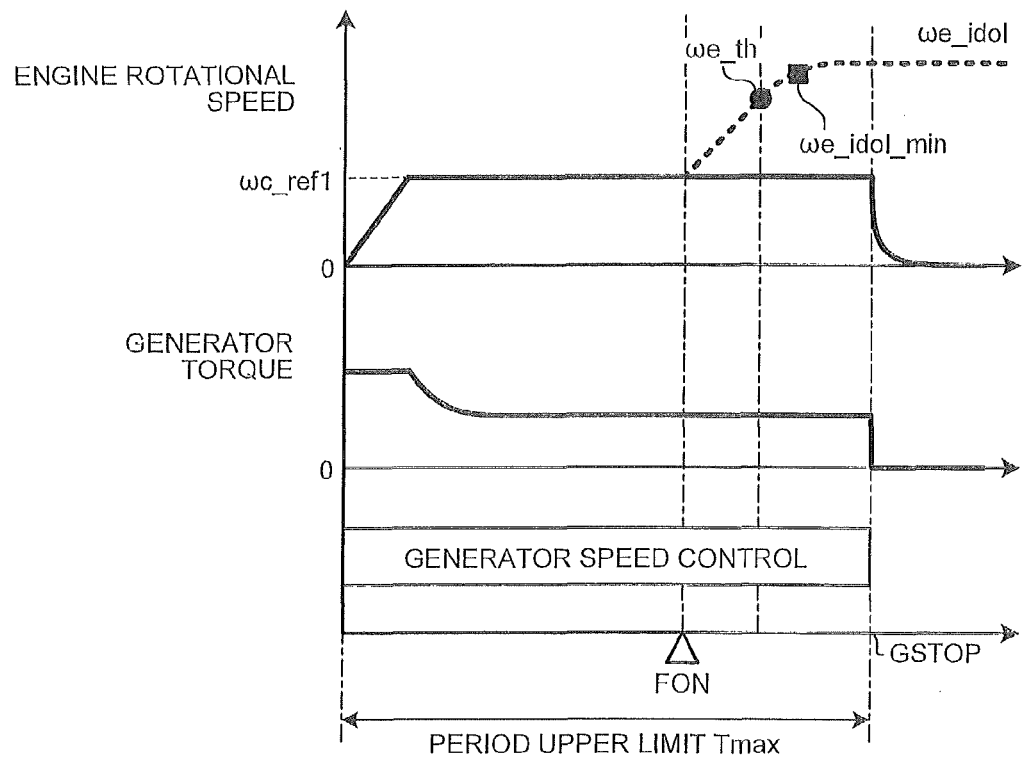
FIG. 8 is a diagram explaining a third starting method in the vehicle control apparatus in the first embodiment.

FIG. 8 is a diagram explaining the third starting method in the vehicle control apparatus in the first embodiment. In the third starting method shown in FIG. 8, a period upper limit value Tmax is set in the rotational speed control for the generator 2. Specifically, in an example shown in FIG. 8, when the fuel injection command FON of the engine is not established and the engine rotational speed does not increase to the idling rotational speed ωe_idol even if the period upper limit value Tmax is exceeded, the gate cutoff signal GSTOP is output to turn off energization to the generator 2. According to this control, it is possible to determine a failure and a deficiency of the engine 1, be brought out of an abnormal rotation state, and protect the engine 1.

(Fourth Starting Method)

Figure 9:
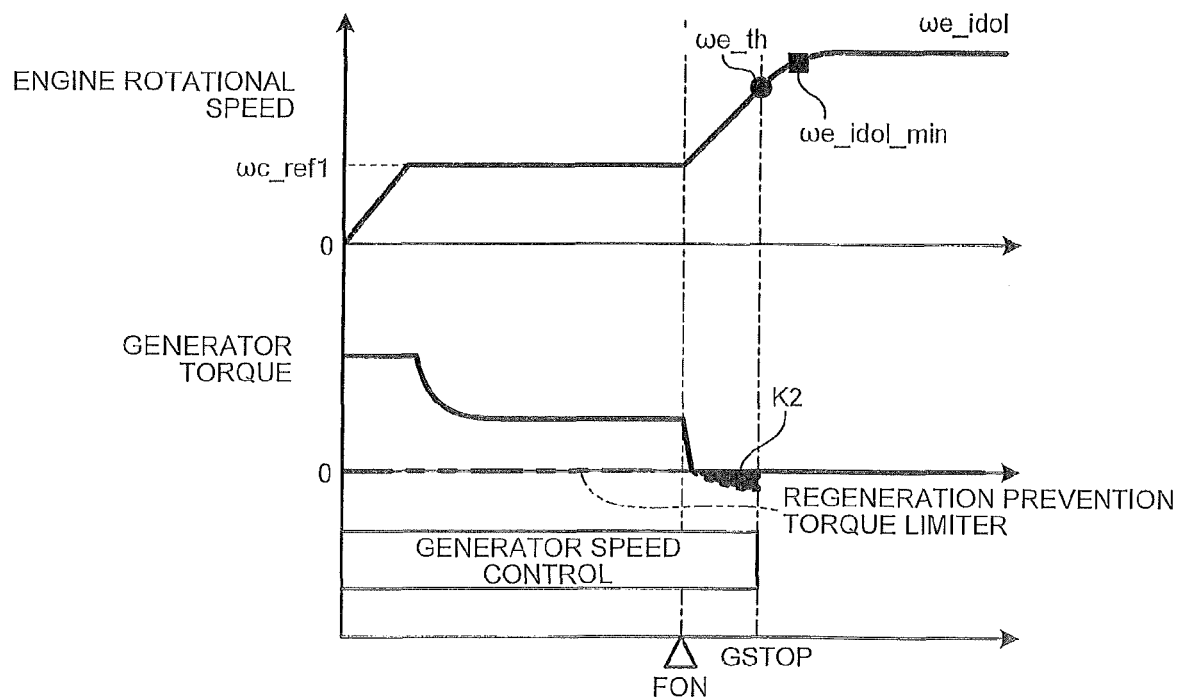
FIG. 9 is a diagram explaining a fourth starting method in the vehicle control apparatus in the first embodiment.

FIG. 9 is a diagram explaining the fourth starting method in the vehicle control apparatus in the first embodiment. In the fourth starting method, when the rotational speed control for the generator 2 is performed, a limit value of the lower limit torque limiter 19 (see FIG. 5) provided in the converter controller 9 is set to zero as indicated by an alternate long and two short dashes line on the time axis of FIG. 9 to suppress a regenerative operation. According to the control, because the generator torque does not fall below zero, it is possible to start the engine 1 without generating regenerative torque equivalent to an area K2 indicated by hatching. Therefore, it is possible to smoothly and surely perform transition to the idling state of the engine 1 while preventing an engine stall.

As explained above, with the vehicle control apparatus and the control method for the hybrid vehicle for railroad according to the first embodiment, the rotational speed threshold in performing control of forcibly turning off energization to the generator is set between the generator-rotational-speed command value at the time when the fuel injection start command is output and the engine idling rotational speed, whereby control is performed such that energization to the generator is turned off before the engine rotational speed reaches the idling rotational speed. Therefore, it is possible to smoothly and surely start the engine using the generator.

With the vehicle control apparatus and the control method for the hybrid vehicle for railroad according to the first embodiment, the generator-rotational-speed command values are provided in multiple stages and the generator-rotational-speed command values provided in multiple stages are selected in order starting from the smallest generator-rotational-speed command value at predetermined time intervals to gradually increase the engine rotational speed. Therefore, even when the start characteristic on the engine 1 side changes depending on the environmental temperature, it is possible to improve certainty of the start.

With the vehicle control apparatus and the control method for the hybrid vehicle for railroad according to the first embodiment, the predetermined period upper limit value is provided and, when the fuel injection to the engine is not established and the engine rotational speed does not increase to the idling maintenance rotational speed even if the period upper limit value is exceeded, control is performed such that energization to the generator is turned off. Therefore, it is possible to determine a failure and a deficiency of the engine, be brought out of an abnormal rotation state, and protect the engine.

With the vehicle control apparatus and the control method for the hybrid vehicle for railroad according to the first embodiment, the lower limit torque limiter is provided on the input side of the converter controller to suppress the regenerative operation during the engine start. Therefore, it is possible to smoothly and surely perform transition to the idling state of the engine 1 while preventing an engine stall.

Second Embodiment

Figure 10:
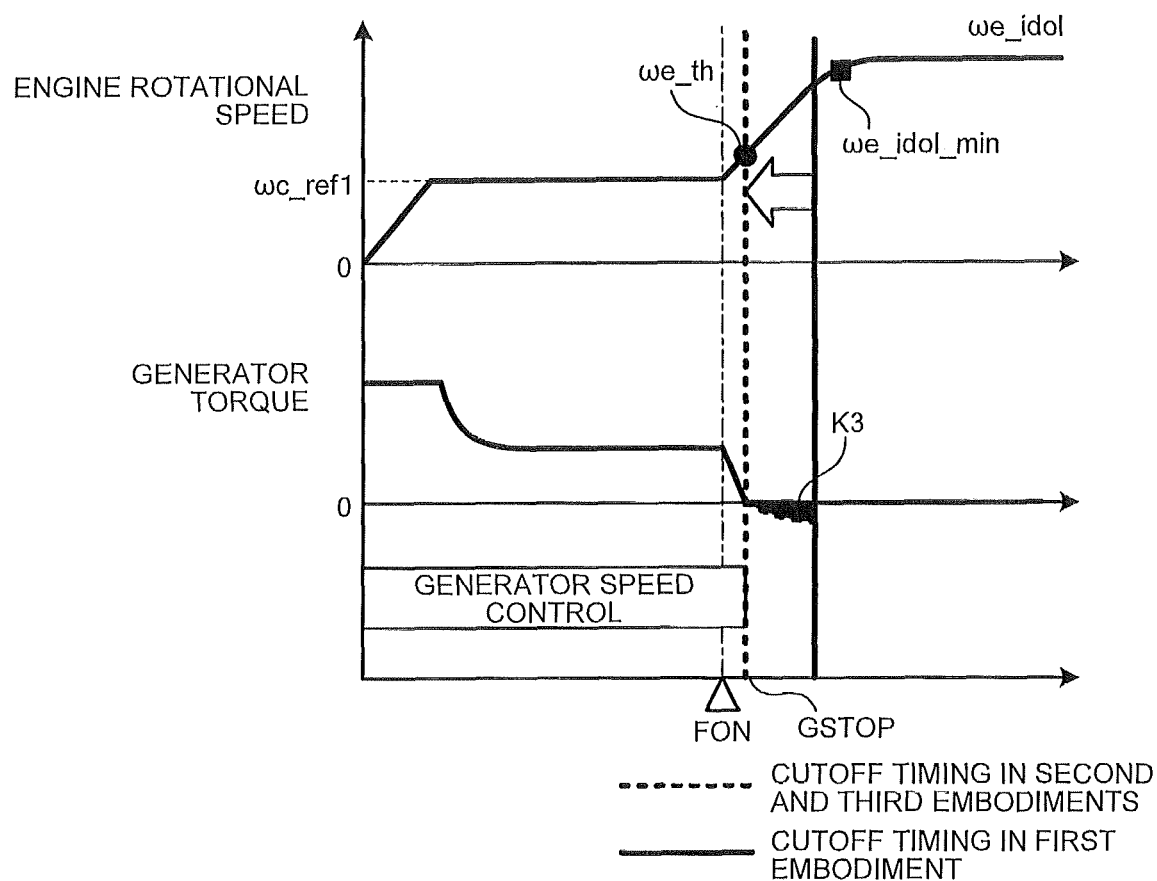
FIG. 10 is a diagram explaining a fifth starting method according to a second embodiment.

FIG. 10 is a diagram explaining a starting method (a fifth starting method) according to a second embodiment.

In the fifth starting method, compared with the fourth starting method according to the first embodiment, timing for transmitting the gate cutoff signal GSTOP from the system controller 8 to the converter 3 is different. The voltage controller 18 (see FIG. 5) provided in the converter controller 9 generates, using at least two of the electric currents Iu, Iv, and Iw of the phases detected by the current sensor 11 shown in FIG. 1, the gate signal GP for controlling the converter 3.

Control executed by the voltage controller 18 is called vector control. When the vector control is performed, the torque current It is recognized. Therefore, it is possible to discriminate power running and regeneration according to the sign of the torque current It. Note that this function is executed by the regenerative-torque determining unit 17 provided in the system controller 8 as shown in FIG. 3. The regenerative-torque determining unit 17 discriminates power running and regeneration according to the sign of the torque current It, generates the gate cutoff signal GSTOP at timing at which generator torque is switched to regenerative torque, outputs the gate cutoff signal GSTOP to the converter 3, and turns off energization to the generator 2. According to this control, it is possible to start the engine 1 without generating regenerative torque equivalent to an area K3 indicated by hatching. It is possible to smoothly and surely execute transition to the idling state of the engine 1 while preventing an engine stall.

Third Embodiment

Figure 11:
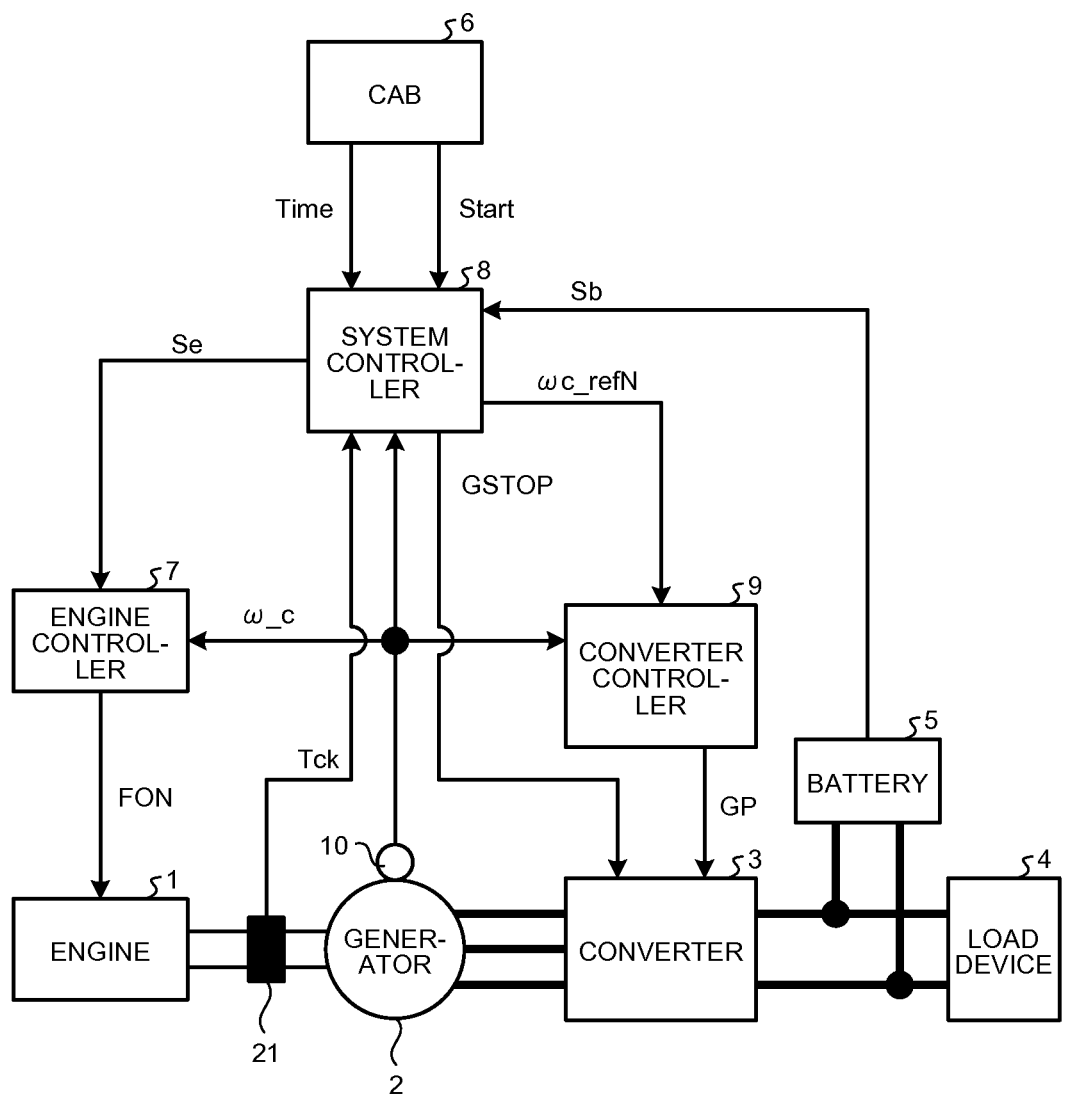
FIG. 11 is a diagram explaining a sixth starting method according to a third embodiment.

FIG. 11 is a diagram explaining a starting method (a sixth starting method) according to a third embodiment. In the sixth starting method, compared with the fifth starting method according to the second embodiment, a detecting unit that detects regenerative torque is different. Specifically, in the third embodiment, a torque detector 21 is provided on a rotating shaft that connects the engine 1 and the generator 2. The torque detector 21 detects a value of generator shaft torque Tck. The generator shaft torque Tck is transmitted to the regenerative-torque determining unit 17 of the system controller 8. The regenerative-torque determining unit 17 determines the presence or absence of a regenerative operation. Note that the subsequent operation is the same as the operation in the second embodiment. Therefore, detailed explanation of the operation is omitted.

With the sixth starting method, when start control of the engine 1 is performed using the generator 2, the presence or absence of the regenerative operation in the generator 2 is determined on the basis of the generator shaft torque Tck detected by the torque detector 21. When the regenerative operation occurs, the gate cutoff signal GSTOP is generated and output to the converter 3 to control energization to the generator 2 to be turned off.

Therefore, it is possible to smoothly and surely execute transition to the idling state of the engine 1 while preventing an engine stall.

Note that the configurations explained in the first and second embodiments are examples of the configuration of the present invention. It goes without saying that the configurations can be combined with other publicly-known technologies or can be changed, for example, by omitting part thereof without departing from the scope of the present invention.

INDUSTRIAL APPLICABILITY

As explained above, the present invention is useful as a vehicle control apparatus and a control method for a hybrid vehicle for railroad that can smoothly and surely execute the start of an engine using a generator.

REFERENCE SIGNS LIST

1 Engine
2 Generator
3 Converter
4 Load device
5 Battery
6 Cab
7 Engine controller
8 System controller
9 Converter controller
10 Rotating speed detector
11 Current sensor
12 Start determining unit
13 Generator-rotational-speed command value MAP
14 to 16 Comparators
17 Regenerative-torque determining unit
18 Voltage controller
19 Lower limit torque limiter
20 Speed PI controller
21 Torque detector

The invention claimed is:

1. A vehicle control apparatus applied to a vehicle driving system including an engine, an engine controller that controls an operation of the engine, a generator coupled to the engine, a converter that converts alternating-current power output from the generator into desired direct-current power, a converter controller that controls an operation of the converter, a load device that receives supply of direct-current power from the converter and operates, a rotational speed detector that detects a rotational speed of the generator, and a battery electrically connected to the load device and the generator, the vehicle control apparatus being configured to be capable of controlling start of the engine, wherein
a system controller that overall controls the engine controller, the converter controller, and the converter is provided, and
when a plurality of command values are provided in multiple stages as the rotational-speed command value, the system controller selects the rotational-speed command values that are greater than zero in order starting from a smallest rotational-speed command value at predetermined time intervals, drives, through the converter controller, the generator with a rotational-speed command value smaller than an idling maintenance rotational speed of the engine so that a first one of the rotational-speed command values is maintained at a constant speed for a first predetermined time interval and is then increased to a second one of the rotational-speed command values after the beginning of a second predetermined time interval, and starts, through the engine controller, fuel injection to the engine after the increase to second one of the rotational-speed command values.

2. The vehicle control apparatus according to claim 1, wherein when a rotational speed of the engine reaches a predetermined threshold that is larger than the rotational-speed command value and smaller than the idling maintenance rotational speed, a control signal for turning off energization to the generator is output to the converter.

3. The vehicle control apparatus according to claim 1, wherein a period upper limit value is set for control of the generator and, when fuel injection to the engine is not established and a rotational speed of the engine does not reach the idling maintenance rotational speed even if the period upper limit value is exceeded, energization to the generator is turned off.

4. The vehicle control apparatus according to claim 1, wherein
a torque detector is provided on a rotating shaft that connects the engine and the generator, and
the system controller determines presence or absence of a regenerative operation in the generator on a basis of a torque value detected by the torque detector and, when determining that a regenerative operation occurs, outputs, to the converter, a control signal for turning off energization to the generator.

5. A control method for a hybrid vehicle for railway including an engine, an engine controller that controls an operation of the engine, a generator coupled to the engine, a converter that converts alternating-current power output from the generator into desired direct-current power, a converter controller that controls an operation of the converter, a load device that receives supply of direct-current power from the converter and operates, and a battery electrically connected to the load device and the generator, the method comprising:

a first step of selecting rotational-speed command values that are greater than zero in order starting from a smallest rotational-speed command value at predetermined time intervals, and driving, through the converter controller, the generator with a rotational-speed command value smaller than an idling maintenance rotational speed of the engine so that a first one of the rotational-speed command values is maintained at a constant speed for a first predetermined time interval and is then increased to a second one of the rotational-speed command values after the beginning of a second predetermined time interval; and a second step of starting, through the engine controller, fuel injection to the engine after the increase to second one of the rotational-speed command values.

6. The control method for the hybrid vehicle for railroad according to claim 5, further comprising a third step of outputting, when a rotational speed of the engine reaches a predetermined threshold that is larger than the rotational-speed command value and smaller than the idling maintenance rotational speed, to the converter, a control signal for turning off energization to the generator.

7. The control method for the hybrid vehicle for railroad according to claim 6, wherein a period upper limit value is set for control of the generator and, when fuel injection in the second step is not established and a rotational speed of the engine does not reach the idling maintenance rotational speed even if the period upper limit value is exceeded, control is performed such that energization to the generator is turned off even when a condition of the third step is not satisfied.

8. A vehicle control apparatus applied to a vehicle driving system including an engine, an engine controller that controls an operation of the engine, a generator coupled to the engine, a converter that converts alternating-current power output from the generator into desired direct-current power, a converter controller that controls an operation of the converter, a load device that receives supply of direct-current power from the converter and operates, a rotational speed detector that detects a rotational speed of the generator, and a battery electrically connected to the load device and the generator, the vehicle control apparatus being configured to be capable of controlling start of the engine, wherein a system controller that overall controls the engine controller, the converter controller, and the converter is provided, and the system controller drives, through the converter controller, the generator with a rotational-speed command value smaller than an idling maintenance rotational speed of the engine, and starts, through the engine controller, fuel injection to the engine after an elapse of a predetermined time, the converter controller includes a lower limit torque limiter that limits a lower limit value to zero for a torque command that is based on proportional integration control, an input of which is difference information between a generator-rotational-speed command value to the generator and the generator rotational speed, and the lower limit torque limiter suppresses a regenerative operation during start of the engine.

9. The vehicle control apparatus according to claim 8, wherein when a rotational speed of the engine reaches a predetermined threshold that is larger than the rotational-speed command value and smaller than the idling maintenance rotational speed, a control signal for turning off energization to the generator is output to the converter.

10. The vehicle control apparatus according to claim 8, wherein a period upper limit value is set for control of the generator and, when fuel injection to the engine is not established and a rotational speed of the engine does not reach the idling maintenance rotational speed even if the period upper limit value is exceeded, energization to the generator is turned off.

11. The vehicle control apparatus according to claim 8, wherein a torque detector is provided on a rotating shaft that connects the engine and the generator, and the system controller determines presence or absence of a regenerative operation in the generator on a basis of a torque value detected by the torque detector and, when determining that a regenerative operation occurs, outputs, to the converter, a control signal for turning off energization to the generator.

\* \* \* \* \*